United States Patent Office 2,852,516
Patented Sept. 16, 1958

2,852,516
METHOD FOR PREPARING AMINO-FORMAMIDO COMPOUNDS

Frederick Comte, Kirkwood, Mo., assignor to Monsanto Chemical Company, St. Louis, Mo., a corporation of Delaware No Drawing. Application April 17, 1957
Serial No. 653,308

9 Claims. (Cl. 260—256.4)

This invention relates to the preparation of intermediates useful in the synthesis of purines and more specifically pertains to an improved method of formylating a 4,5-diaminouracil or salts thereof.

In the synthesis of purines such as xanthine, caffeine, theobromine, theophylline, among others, it has been the practice to prepare a six-membered heterocyclic compound containing an amino group attached to each of two adjacent ring carbon atoms. In a subsequent step, the diamine has been reacted with formic acid to prepare a heterocyclic compound having a formamido and an amino group attached to two adjacent ring carbon atoms. The formamido-amino substituted heterocyclic compound has then been subjected to conditions promoting ring closure whereby, through the splitting out of water involving the amino group and the formyl group, ring closure occurs. By employing this general procedure there has been prepared purines containing the structure

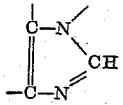

wherein the two carbon atoms are also members of a six-membered heterocyclic ring.

The general process described above has been successfully employed in the synthesis of the stimulants caffeine, theobromine, and theophylline and can be employed in the synthesis of other 2,6-dioxypurines all of which have the following formula:

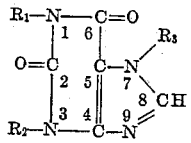

wherein each of any combination of the R groups can be hydrogen or an alkyl group. In the preparation of the 2,6-dioxypurines a formamido-amino uracil is subjected to conditions promoting ring closure, the formamido-amino uracil intermediate having been prepared by the formylation of a diaminouracil.

Several methods have been proposed for the preparation of the formamido-amino uracil employed as an intermediate in the synthesis of purines. One method previously suggested involves the reaction of the diaminouracil as a free base with concentrated formic acid. Another process employs an acid salt of the diaminouracil with concentrated formic acid together with sodium formate and sulfuric acid. In these processes the formic acid employed is of about 50% to 90% by weight formic acid with the remainder being water. All of these processes employed a substantial excess of formic acid, i. e. from 10 to 30 equivalents of formic acid per equivalent of the diaminouracil. The yields of the desired formamidoamino uracil obtained from these processes are low.

Recently, methods for preparing formamido-amino uracils by reacting a diaminouracil or its acid salt with dilute aqueous formic acid of a concentration of from 2% to 37% by weight have been proposed. These processes employ more nearly the theoretical amount of equivalents of formic acid per equivalent of the diaminouracil required for formylation. An excess of formic acid, in the range of 1 to 5 equivalents of formic acid per equivalent of the diaminouracil, is said to give the best yields. Acid salts, such as the sulfuric, phosphoric, or hydrochloric acid salts, of the diaminouracils are employed in the dilute formic acid processes together with sodium formate which reacts with the acid portion of the salt and liberates formic acid.

Although the latter processes employing dilute formic acid were a substantial improvement over the expensive lower yield producing processes employing excessive quantities of concentrated formic acid, the formamido-amino uracil product obtained therefrom contained impurities from which substantially pure, white dioxypurines could not be made. In the synthesis of caffeine from 4-amino-5-formamidouracil produced by the dilute formic acid processes, the caffeine recovered was off color ranging from yellow to green. To produce a white caffeine, the crude caffeine product had to be purified by a time consuming and expensive process which also resulted in an appreciable loss of caffeine.

Furthermore, all of the above formylation processes required the preparation of the diamino reactant in a separate step generally by the reduction of an amino-isonitroso compound corresponding to the diamino.

However, it has now been discovered that amino-formamido compounds and including amino-formamido derivatives of a six-membered heterocyclic ring compound containing four carbon atoms and two nitrogen atoms arranged as in the pyrimidine structure:

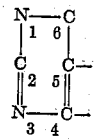

wherein the amino group and the formamido group are attached to two different but adjacent ring carbon atoms, can be prepared by heating an aqeous composition comprising the corresponding imino-isonitroso compound and for each equivalent thereof at least from about 7 to 12 equivalents of formic acid and an amount of a polyvalent metal above hydrogen in the electromotive series slightly in excess, 0.1 to 0.2 mole in excess, of that required to liberate two moles of hydrogen. By this process, reduction of the imino-isonitroso compound to the diamine and the formylation thereof to the desired amino-formamido compound takes place simultaneously. The process of this invention results in the formation of a substantially pure amino-formamido compound and, in the case of the amino-formamido substituted heterocyclic compounds described above, these derivatives can be converted to substantially pure purines and xanthines which will not discolor.

The preferred class of imino-isonitroso reactants are the 4-imino-5-isonitroso uracils and the alkali metal salts thereof. This preferred class of reactants includes 4-imino-5-isonitroso uracil, and the 1 and 3 alkyl substituted 4 - imino - 5 - isonitroso uracils such as 1 - methyl, 1,3-dimethyl, 1,3 - diethyl, 1,3 - di - n - propyl, and 1,3 - di-butyl, 4 - imino - 5 - isonitroso uracils and their sodium and potassium salts, among others. The preferred alkyl 4 - imino - 5 - isonitroso uracils are those whose alkyl groups contain from 1 to 4 carbon atoms.

In a particular embodiment of this invention employed to prepare 4-amino-5-formamido uracils, it is preferred to heat the aqueous composition containing the imino-isonitroso reactant, formic acid and the poly-valent metal at a temperature in excess of 80° C. and more specifically in the range of 80° C. to the boiling point of the reaction mixture. In general, the process of this invention is carried out at or near the boiling point of the reaction mixture. Temperature in excess of the boiling point of the reaction mixtures can be employed where the process is carried out under higher pressures than those preferably employed in carrying out the process of this invention. Reaction temperatures below 80° C. can be employed, however, such reactions are much too slow to be acceptable industrial processes.

The reactants may be mixed at a temperature below the reaction temperature and thereafter heated to the desired reaction temperature. By an alternative procedure, the aqueous formic acid composition is prepared by diluting formic acid of any strength to give the desired aqueous formic acid for the reaction or by combining aqueous solutions of sodium formate and sulfuric acid thereby avoiding the handling of formic acid per se, then heating the aqueous formic acid reaction medium to reaction temperature and then charging the poly-valent metal and imino-isonitroso reactant. Still another alternative procedure involves the use of an alkali metal derivative such as the sodium salt of the imino-isonitroso reactant in place of the free base. Such derivatives will, of course, consume a portion of the formic acid and form the free base in situ. Where this procedure is followed, an equivalent amount of sulfuric acid is added to regenerate the formic acid from the formate or, where sodium formate is charged, additional sulfuric acid is charged to convert the alkali metal derivative of the imino-isonitroso compound to the free base. For example the sodium salt of 4-imino-5-isonitroso uracil, which may be

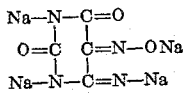

or

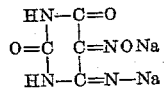

is converted to the free base before addition to the reaction vessel or can be added to the reaction vessel and be converted to the free base (where all the sodiums are replaced by hydrogens) by the addition of an excess of formic acid, by the addition of an amount of sulfuric acid necessary to convert the salt to the free base. It will, of course, be understood that the sulfuric acid added when sodium formate is used as a source of formic acid will be in addition to that required to react with sodium formate. In any case, all the above are equivalents of the process hereinbefore defined which comprises heating an aqueous composition comprising an imino-isonitroso compound and for each equivalent thereof from at least about 7 to 12 equivalents of formic acid and an amount of a poly-valent metal above hydrogen in the electromotive series slightly in excess, 0.01 to 0.2 mole excess, of that required to liberate two moles of hydrogen.

Excellent quality and yields of the amino-formamido products can be obtained from the process of this invention by the use of about 7 to 12 equivalents of formic acid, greater proportions of formic acid can be employed if desired. Thus the reaction medium can contain up to 30 or more equivalents of formic acid per equivalent of imino-isonitroso reactant and an excellent quality amino-formamido compound will be produced. However, as the formic acid concentration increases, the solubility of the desired product increases in the reaction medium thereby unduly complicating the recovery of the desired product. Also the use of excessive quantities of formic acid will involve recovery of the unused formic acid for reuse to make possible the lowest cost production of the desired formylated product. Less than about seven equivalents of formic acid can be employed but in this case the amino-formamido product is formed as exceedingly fine particles which are extremely difficult to recover because these fine particles form a dense compact filter cake that, for all practical purposes, becomes impervious.

After the reduction-formylation reaction has been completed, the reaction mixture may be treated in any suitable manner for the recovery of the amino-formamido product. When the preferred concentration of formic acid is employed, i. e. about 7 to 12 equivalents per equivalent of the imino-isonitroso reactant, the formylated product is recovered by cooling the reaction medium to precipitate this product from solution as a sandy crystalline product which filters and washes readily. By the process of this invention the amino-formamido products can be obtained as substantially pure compounds in substantially quantitative yields, 90% or more of theoretical yields.

The following examples will illustrate the process of this invention in detail. It is intended that these examples be illustrative of the invention rather than being a limitation thereon. For, as hitherto stated, the precise proportions of the reactants employed as well as the reactants themselves may be varied as desired. The term "parts" in the following examples is employed to indicate parts by weight.

Example I

Into a suitable glass lined reactor equipped with a reflux condenser and an agitator, there is charged 0.36 mole of the sodium salt of 4-imino-5-isonitroso uracil, 625 parts of water and 60 parts (0.92 mole) of zinc dust. The reactor is sealed and evacuated to 20 mm. Hg while the slurry therein is being agitated. Nitrogen is charged to the reactor until a pressure of 20 pounds is obtained. The vapor space in the reactor is purged to about two pounds and then recharged with nitrogen to about 20 pounds. The charging and purging of the vapor space in the reactor is repeated three times resulting in a positive pressure of about two pounds prior to the addition of formic acid. An aqueous solution containing 85% by weight of formic acid is slowly added to the stirred slurry over a period of about one hour during which time 177 parts of this aqueous formic acid (3.28 moles) is added and the temperature of the reaction mixture is maintained at about 40° C. After all the formic acid solution has been added, the reaction mixture is heated until refluxing begins about 94° C. Refluxing is maintained for about three hours supplying sufficient heat as required to maintain refluxing conditions. The temperature during this three hour period is increased gradually from 94° C., to about 102° C.

After three hours of refluxing the reaction mixture is cooled to about 80° C. with stirring and withdrawn from the reactor and filtered. The sandy crystalline 4-amino-5-formamido uracil product in the filter cake is washed with hot water about 80° C. until all of the zinc formate has been removed from the filter cake. Completion of the removal of zinc formate can be readily determined by sampling the filtrate during the washing process. When the filtrate is substantially colorless and has a specific gravity of about 1.002 at about 80° C. substantially all of the zinc formate will have been removed.

By the above described process there is obtained 55.8 parts of 4-amino-5-formamido uracil 91.3% of theory. This product is a white crystalline solid with a particle size of about that of fine silica sand.

Example II

The process of Example I is repeated except that 4.3 moles of formic acid as an 85% aqueous solution was added in place of the 3.28 moles. By this process substantially pure, white, granular 4-amino-5-formamido uracil is recovered in a yield in excess of 90%.

Example III

The process described in Example I is repeated except that the formic acid is formed in situ by charging about 3 moles of sodium formate to the aqueous slurry before purging the vapor space of the reactor. Then 3 molar quivalents (1.5 moles) of sulfuric acid as 95% $H_2SO_4$ are added slowly after the reactor has been purged. The process thereafter is as described in Example I. By this embodiment of the process of this invention substantially pure, white, granular 4-amino-5-formamido uracil is obtained in high yields.

Example IV

The process of Example I is repeated except that 0.36 mole of the sodium salt of 1-methyl-4-imino-5-isonitroso uracil is employed in placed of the sodium salt of 5-isonitroso-6-imino uracil. Substantially pure, white, granular 1-methyl-4-amino-5-formamido uracil is obtained.

Example V

The process of Example I is repeated except that 0.36 mole of 1,3-dimethyl-4-imino-5-isonitroso uracil is employed in place of the sodium salt of 4-imino-5-isonitroso uracil and 2.8 moles of formic acid (85%) are employed. By this process, substantially pure, white, granular 1,3-dimethyl-4-amino-5-formamido uracil is obtained.

Example VI

The process of Example I is repeated except that 0.36 mole of 1,3-di-n-propyl-4-imino-5-isonitroso uracil is employed in place of the sodium salt of 4-imino-5-isonitroso uracil and 2.8 moles of formic acid (85%) are employed. By this process substantially pure, white, granular 1,3-di-n-propyl-4-amino-5-formamido uracil is obtained.

While zinc is the preferred metal in the process of this invention other poly-valent metals above hydrogen in the electromotive series may be employed, as for example, tin, aluminum, iron, magnesium, nickel, and the like.

This application is a continuation-in-part of Serial Number 352,969, filed May 4, 1953, now abandoned.

What is claimed is:

1. The method comprising preparing an amino-formamido uracil having the formula

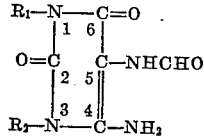

wherein $R_1$ and $R_2$ are members selected from the class consisting of hydrogen and lower alkyl groups, by heating an aqueous composition comprising the corresponding 4-imino-5-isonitroso compound and for each equivalent thereof from 2.01 to 2.2 moles of zinc and from about 7 to 12 equivalents of formic acid, and recovering the amino-formamido uracil from the reaction medium.

2. The method of claim 1 wherein the uracil reactant is 1,3-dimethyl-4-imino-5-isonitroso uracil.

3. The method of claim 1 wherein the uracil reactant is 1,3-di-n-propyl-4-imino-5-isonitroso uracil.

4. The method of claim 1 wherein the uracil reactant is 1-methyl-4-imino-5-isonitroso uracil.

5. The method comprising heating an aqueous composition comprising 4-imino-5-isonitroso uracil and for each equivalent thereof from 2.01 to 2.2 moles of zinc and from about 7 to 12 equivalents of formic acid, and recovering 4-amino-5-formamido uracil from the reaction medium.

6. The method of claim 5 wherein the formic acid is formed in situ by the reaction of sodium formate and sulfuric acid.

7. A method which comprises the simultaneous reduction and formylation of the imino and isonitroso groups in a compound having the formula

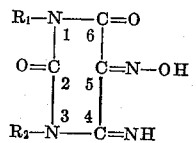

wherein $R_1$ and $R_2$ are members selected from the class consisting of hydrogen and lower alkyl groups by heating said imino-isonitroso compound in an aqueous medium with at least 7 equivalents of formic acid and in the presence of zinc in excess of that required to liberate two moles of hydrogen per mole of said imino-isonitroso compound, and recovering the amino-formamido compound so prepared.

8. A method which comprises the simultaneous reduction and formylation of the imino and isonitroso groups in a compound having the formula

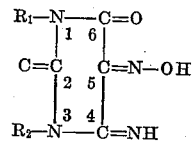

wherein $R_1$ and $R_2$ are members selected from the class consisting of hydrogen and lower alkyl groups by heating said imino-isonitroso compound in an aqueous medium with from 7 to 12 equivalents of formic acid and in the presence of zinc in excess of that required to liberate two moles of hydrogen per mole of said imino-isonitroso compound, and recovering the amino-formamido compound so prepared.

9. The process of claim 8 wherein for each mole of imino-isonitroso compound there is present from 2.01 to 2.2 moles of zinc.

References Cited in the file of this patent

UNITED STATES PATENTS 2,655,501    Weinkanff _____ Oct. 13, 1953

OTHER REFERENCES

Traube: Ber. Deut. Chem., 33, 3041 and 3052 (1900).

Beilstein: Organische Chemie, Erstes Ergänzungswerk (1st supp.), page 410, vol. 24.

Bobranski et. al.: J. Am. Pharm. Assn. (Science Edition), 37, 62–64 (1948).